United States Patent
Bourban et al.

(10) Patent No.: US 8,025,951 B2
(45) Date of Patent: Sep. 27, 2011

(54) MULTI-STAGE ENAMELLED DIAL

(75) Inventors: Steve Bourban, Ecublens (CH); Rudolf Dinger, Saint-Aubin (CH); Nicolas Blanckaert, Neuchâtel (CH)

(73) Assignee: Asulab S.A., Marin (CH)

( * ) Notice: Subject to any disclaimer, the term of this patent is extended or adjusted under 35 U.S.C. 154(b) by 1176 days.

(21) Appl. No.: 11/231,764

(22) Filed: Sep. 22, 2005

(65) Prior Publication Data
US 2006/0062971 A1    Mar. 23, 2006

(51) Int. Cl.
*B32B 3/00* (2006.01)
*A44C 11/00* (2006.01)

(52) U.S. Cl. ............. 428/172; 428/210; 428/542.2; 63/21; 63/34

(58) Field of Classification Search ........... 428/67, 428/137, 138, 172, 210, 542.2; 63/21, 34; 29/896.32; 73/1.43; 368/232
See application file for complete search history.

(56) References Cited

U.S. PATENT DOCUMENTS

| | | | |
|---|---|---|---|
| 2,001,725 A | | 5/1935 | Harris |
| 2,716,829 A | * | 9/1955 | Huguenin et al. ......... 40/615 |
| 3,086,880 A | * | 4/1963 | Compton ................ 428/141 |
| 3,718,497 A | * | 2/1973 | Rice ...................... 428/163 |
| 3,989,603 A | * | 11/1976 | Montavon ............... 205/121 |
| 5,609,804 A | * | 3/1997 | Alieri ..................... 264/644 |
| 5,972,233 A | * | 10/1999 | Becker et al. ........... 216/28 |
| 6,753,068 B2 | * | 6/2004 | Nakamura et al. ....... 428/172 |
| 6,802,276 B2 | * | 10/2004 | Sugimoto ................ 116/62.1 |
| 2004/0032797 A1 | * | 2/2004 | Sato et al. ............... 368/232 |

FOREIGN PATENT DOCUMENTS

| | | |
|---|---|---|
| CH | 333 245 A | 10/1958 |
| GB | 2 052 113 A | 1/1981 |
| JP | 61 202184 A | 9/1986 |

OTHER PUBLICATIONS

European Search Report completed Jun. 22, 2005 in corresponding European patent application No. EP 04 02 2605.
Notice of Allowance issued in related U.S. Appl. No. 12/710,676, on Jan. 20, 2011.

* cited by examiner

*Primary Examiner* — Donald J Loney
(74) *Attorney, Agent, or Firm* — Griffin & Szipl, P.C.

(57) ABSTRACT

The dial with an enamel coating (2) includes a base plate (1) made of ceramic material with portions in relief (4, 8) obtained by partial or through shaping or machining, formed by an insert (10) also having an enamel coating (12) and whose thickness defines a recess (4) or an embossment (8).

13 Claims, 2 Drawing Sheets

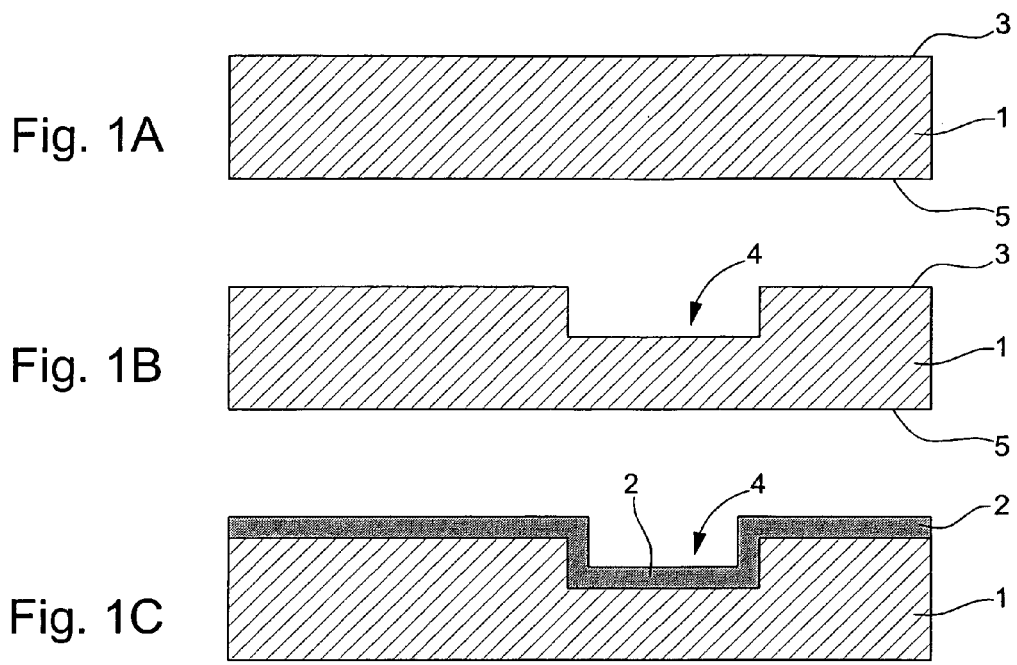
Fig. 1A
Fig. 1B
Fig. 1C
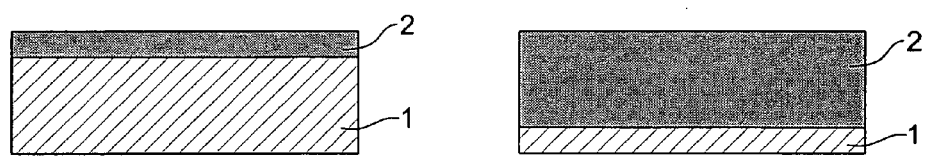
Fig. 2A    Fig. 3A
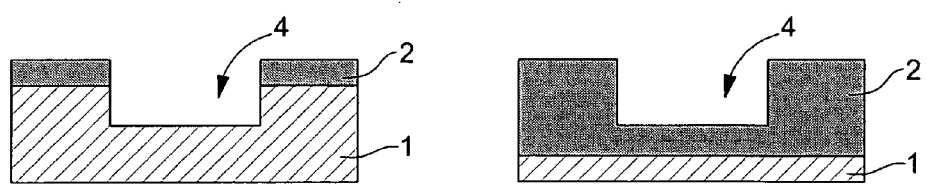
Fig. 2B    Fig. 3B
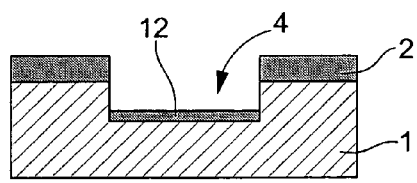
Fig. 2C

MULTI-STAGE ENAMELLED DIAL

This application claims priority from European Patent Application No. 04022605.2 filed Sep. 22, 2004, the entire disclosure of which is incorporated herein by reference.

FIELD OF THE INVENTION

The present invention concerns a multi-stage enameled dial, i.e. a dial whose base plate has one or more recesses, or conversely bumps, the surface of said plate being covered with layers of enamel. This type of dial is used particularly in a timepiece wherein the recesses delimit for example secondary dials, such as those of the small second, or chronograph counters. This multi-stage design can also have a purely aesthetic purpose.

BACKGROUND OF THE INVENTION

The usual manner of making multi-stage enameled dials consists in taking a metal plate of very small thickness, generally made of copper, a copper alloy or silver, forming a layer of enamel at the surface of the substrate by successive deposition and firing operations, said layer having a thickness generally comprised between 600 and 800 µm, and a layer of counter enameling of smaller thickness on the back side of the plate. The counter enameling has an essentially technical function countering the stresses that are created in the metal plate during successive firing operations. An aperture of the desired dimensions for the secondary dial is then cut, then the surface of an enameled disc, produced in the same way, is machined and cut to the dimensions of the aperture possibly reducing the thickness of the enamel, and finally the disc is welded in the aperture, which produces a quite visible mark on the back of the dial and can damage the secondary dial. The method that has just been briefly described is very difficult to implement, has a significant discard rate and finally leads to a finished product with a very high cost.

In order to give an enameled on metal dial more relief without having the drawbacks of the aforecited prior art, taking a thicker plate has also been proposed and machining hollows therein that are then covered with a sufficiently thick layer of enamel to conceal the metallic appearance of the bottom. The enameled dial thereby obtained is significantly thicker, which causes an increase in the dimensions of the case, which then no longer answers current requirements for wristwatches.

Deforming a metal base plate has also been proposed, for example by stamping, and then carrying out the enameling. The parts that have been deformed have altered thermal behaviour, such that the firing operations usually cause cracks in the enamel layers that lead to the manufacture part being discarded.

SUMMARY OF THE INVENTION

It is thus an object of the present invention to overcome the drawbacks of the aforecited prior art by providing a multi-stage dial that does not require the back of the dial to be counter enameled, or one part to be welded, in order to create, for example, a secondary dial in a hollow.

The invention therefore concerns a multi-stage enameled dial comprising a base plate whose surface includes portions in relief forming recesses, or conversely, bumps, for decorative or technical purposes, for example for delimiting secondary dials in a timepiece, the entire surface of the dial and the portions in relief being covered with layers of enamel. The dial is characterized in that the base plate is made of ceramic material and in that the portions in relief are made by pre-shaping said base plate prior to enameling or by machining the enamel layer, through the latter, or even through the base plate. This multi-stage enameled dial can in fact be obtained in several different ways.

In a first embodiment, the portions in relief desired at the surface of the dial are formed during manufacture of the ceramic base plate for example by the CIM method (Ceramic Injection Molding) by using a suitable mold, then, by successive depositions and firing operations, the entire surface and portions in relief are enameled to obtain directly a finished dial. Equally, the portions in relief can be formed by machining the plane surface of a ceramic base plate.

According to a second embodiment, the entire surface of the base plate is first enameled, then a machining operation is performed by spot facing or etching through the entire thickness of the enamel layer and partially through the base plate, then the bottom of the recess thereby obtained is enameled. According to a variant, the enamel coating formed is sufficiently thick for the recess to be machined without reaching the bottom plate.

According to a third embodiment, the entire surface of the base plate is first of all coated with enamel, then a through passage is machined through the enamel coating and the base plate. A ceramic insert, with the same dimensions as the through passage and whose visible surface comprises an enamel coating that may be identical to or different from that coating the entire surface, is prepared separately. The insert is then inserted in the through passage and maintained in place if necessary, by bonding. Depending upon the total thickness of the insert with its enameling, it is thus possible to have an enameled dial having a recess, or conversely a bump.

As can be seen, a multi-stage enameled dial made with a ceramic base plate does not require welding, or counter-enameling, given that the thermal expansion coefficient of ceramic and enamel are very close, which thus does not therefore induce deformations that then have to be compensated for.

However, it is possible to conceal the joint between the base plate and the insert by gluing an additional plate at this location having the same contour as the dial, which thus also contributes to keeping the insert in place.

Depending upon the aesthetic appearance desired for the finished product incorporating said dial, this additional plate can be made of ceramic material, like the base plate, or of metal, in the knowledge that its technical function is quite limited.

According to a variant of the foregoing, when the additional plate is made of ceramic material, it may be integral with the insert. According to yet another variant, the additional plate can be provided with a foot for securing the dial, and the periphery of said additional plate can be arranged to enable it to be embedded in the bottom of the base plate.

BRIEF DESCRIPTION OF THE DRAWINGS

Other features and advantages of the present invention will appear in the following description of several embodiments of the invention, given by way of non-limiting illustration, with reference to the annexed drawings, in which:

FIGS. 1A, 1B and 1C show in cross-section the steps leading to a first embodiment of the invention;

FIGS. 2A, 2B and 2C show a second embodiment;

FIGS. 3A and 3B show a variant of the second embodiment;

DETAILED DESCRIPTION OF THE INVENTION

Figure 4A:
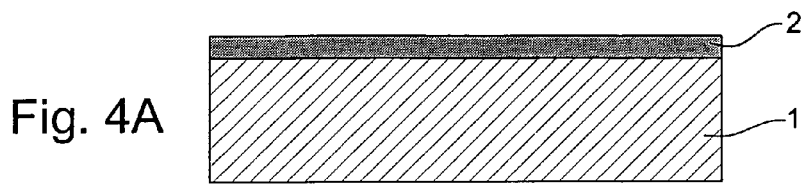
FIGS. 4A, 4B and 4C show a third embodiment.

For better comprehension of the drawings, it should be observed first of all that the thicknesses have not all been shown on the same scale, and that only one part of the dial comprising a portion in relief has been shown.

FIGS. 1A to 1C show a first embodiment wherein the dial is made from a ceramic base plate 1 having two parallel and plane faces 3, 5 (FIG. 1A) and wherein a recess 4 (FIG. 1B) is machined by spot facing or etching. The enamel coating is then made by successive deposition and firing operations (FIG. 1C). Base plate 1 can be cut from a large ceramic plate having a thickness comprised between 0.4 mm and 0.9 mm, such values allowing satisfactory mechanical properties to be obtained for the dial. It is also possible to make base plate 1 by direct pre-shaping to the desired dimensions for example by CIM or by pressing. In such case, recess 4 can be formed at the same time. It is clear that in the same way, by machining, pressing or CIM, one could form a portion in relief corresponding to a bump prior to the enameling step, and possibly carry out final machining, for example to improve the aspect ratio as regards the portion in relief.

Given that the ceramic material, for example alumina-based, has a light colour and that it is also possible to incorporate colouring agents therein, the number of enamel layers necessary to have the desired final colour may be smaller, the enamel coating then having a thickness comprised between 0.1 mm and 0.4 mm. Since the thermal expansion coefficients of ceramics and enamel are very close, no tension is generated during firing operations liable to deform base plate 1, such that no counter-enameling is necessary.

FIGS. 2A to 2C show a second embodiment. One starts with a base plate 1 at the surface of which a first enamel coating 2 has already been formed. A recess 4, which passes right through first enamel coating 2 and partially through ceramic base plate 1, is then machined. A second enamel coating 12 is then made in the bottom of recess 4, for example by damping. It is thus possible to give the recess a different colour from that of the dial surface. Evidently, one can then continue as described in the first embodiment, by effecting this second enamel coating over the entire surface of the dial and the portions in relief with an identical or different colour enamel to that of the first coating. According to a variant shown in FIGS. 3A and 3B, enamel coating 2 is sufficiently thick, for example 0.4 mm, that said enamel coating can be machined without reaching ceramic base plate 1. In order to obtain a high level surface state, it is desirable for additional firing to be effected, in order to obtain a polished finish.

Figure 4B:
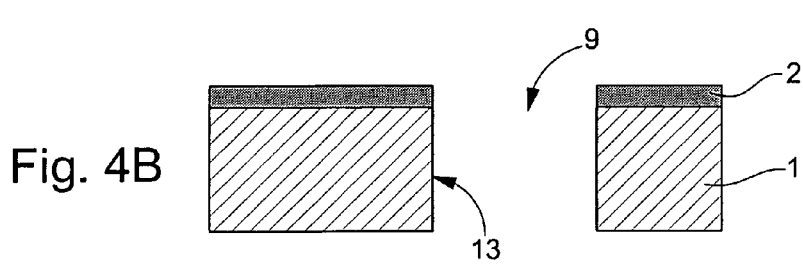
Figure 4C:
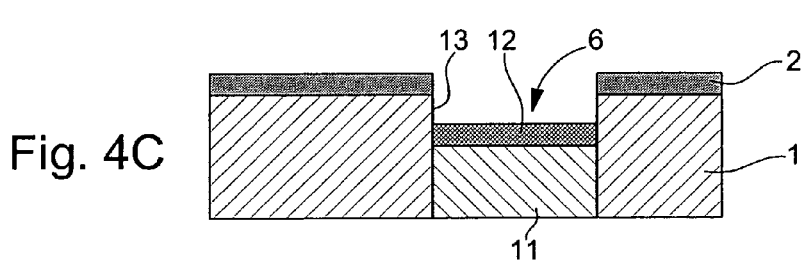
Figure 5:
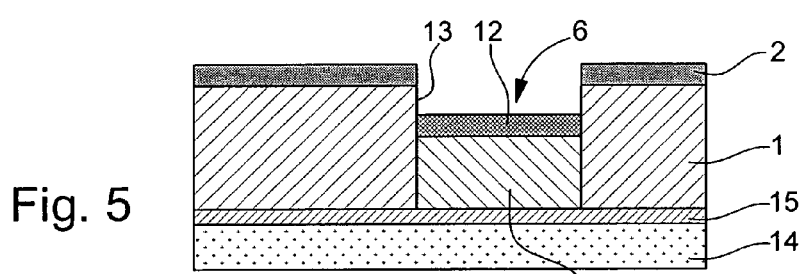
FIGS. 5, 6 and 7 correspond to variants of the third embodiment.

FIGS. 4A to 4C concern an embodiment that differs from those previously described in that the base plate 1 and its enamel coating 2 are machined so as to create a through passage 9. An insert 10 is made separately with a ceramic base 11 matching the contour 13 of through passage 9 and comprising a second enamel coating 12 that is identical to or different from first enamel coating 2. Insert 10 is positioned in passage 9 while being held therein by bonding. In the finished product shown in FIG. 4C, the thickness of base 10 of insert 10 is smaller than that of base plate 1, such that the portion in relief thereby made forms a recess 6. For the same reasons as mentioned previously, the bottom of the base plate does not technically require any counter-enameling.

However, for aesthetical reasons aimed, for example at concealing the contour 13 of the join between base plate 1 and insert 10, it is possible to place an adhesive 15 on the bottom of the dial in order to glue an additional concealing plate 14. Depending upon the aesthetical effect sought as regards the timepiece, the material forming this additional plate can be ceramic, like the base plate, or metal, for example, copper, silver, gold or platinum or alloys of these materials.

Figure 6:
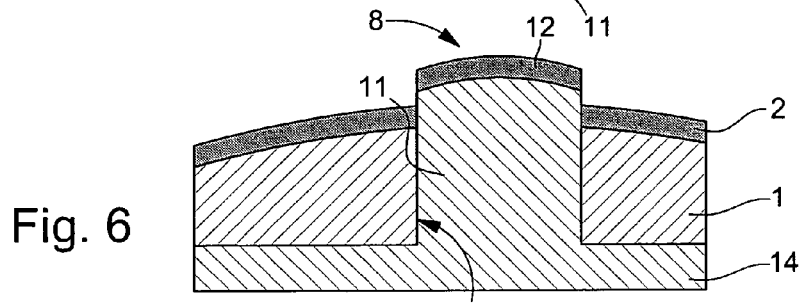

FIG. 6 shows alternative embodiments of the multi-stage dial described hereinbefore. It is seen first of all that the visible surfaces of the dial have a curved shape, which is very easy to accomplish by using the ceramic material for the base plate, and this example for the insert, without creating any particular tension during enameling, i.e. still without requiring any counter-enameling. It can also be seen that the thickness of insert 10 is greater than the height of through passage 9, such that the portion in relief formed is a bump 8. It can be seen finally that the insert can be integral with an additional concealing plate 14 which will then evidently be made of ceramic material.

Figure 7:
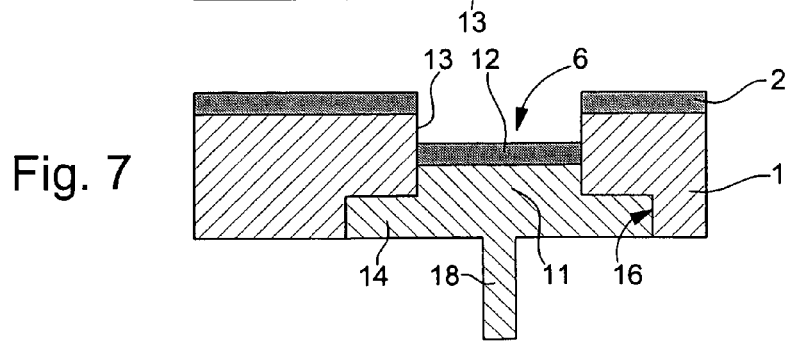

FIG. 7 shows that, at the same time as insert 10 and additional plate 14, a foot 18 can be made, which will allow the dial to be positioned, the additional plate being shown in this example set in the bottom face 5 of the base plate. Foot 18 can evidently occupy a non-central position in order to allow passage of an arbour when recess 6 is a secondary dial.

It is clear that the embodiments that have just been described, and which correspond to the finished products shown in FIGS. 1C, 2C, 3B, 4C, 5, 6 and 7, can be changed. By way of non-limiting example, it is possible, without departing from the scope of the invention, to combine the teaching of FIGS. 1C, 6 and 7 to obtain an enameled ceramic dial comprising a secondary dial in a hollow having a convex surface and whose base plate comprises a foot.

What is claimed is:

1. A timepiece having a multi-stage enameled dial comprising:
    (a) a base plate made of ceramic material having the shape of a primary dial, wherein a surface of the base plate includes one or more portions in relief corresponding to recesses or bumps, wherein the one or more portions in relief form at least a secondary dial; and
    (b) a fired enamel coating, wherein the entire area of the surface of the base plate includes the enamel coating, wherein the entire area of the surface of the base plate including the enamel coating is not flat, wherein the back of the dial is not counter-enameled.

2. The timepiece according to claim 1, wherein the one or more portions in relief of the base plate are made by pre-shaping or machining the base plate.

3. The timepiece according to claim 1, wherein the one or more portions in relief of the base plate are machined in the enamel coating without reaching the base plate.

4. The timepiece according to claim 1, wherein the surface of the base plate is visible and has a curved shape.

5. The timepiece according to claim 1, wherein the base plate comprises a foot that allows the dial to be positioned.

6. The timepiece according to claim 1, wherein the secondary dial includes a hand.

7. The timepiece according to claim 6, wherein the hand is a second hand or a chronographic counter.

8. A timepiece having a multi-stage enameled dial comprising:
    (a) a base plate made of ceramic material having the shape of a primary dial, wherein a surface of the base plate includes one or more portions in relief corresponding to recesses or bumps, wherein the one or more portions in relief form at least a secondary dial; and
    (b) a plurality of fired enamel coatings, wherein portions of the surface of the base plate, except for bottoms and walls of the one or more portions in relief, include a first fired enamel coating, wherein the bottoms of the one or more portions in relief include a fired second enamel coating, wherein the back of the dial is not counter-enameled.

9. The timepiece according to claim 8, wherein color of the first enamel coating is identical to that of the second enamel coating.

10. The timepiece according to claim 8, wherein color of the first enamel coating is different from that of the second enamel coating.

11. The timepiece according to claim 8, wherein the one or more portions in relief of the base plate are machined through the first enamel coating and partially through the base plate.

12. The timepiece according to claim 8, wherein the secondary dial includes a hand.

13. The timepiece according to claim 12, wherein the hand is a second hand or a chronographic counter.

* * * * *

UNITED STATES PATENT AND TRADEMARK OFFICE
CERTIFICATE OF CORRECTION

PATENT NO. : 8,025,951 B2  
APPLICATION NO. : 11/231764  
DATED : September 27, 2011  
INVENTOR(S) : Steve Bourban et al.

Page 1 of 1

It is certified that error appears in the above-identified patent and that said Letters Patent is hereby corrected as shown below:

Title Page, insert

-- (30)  Foreign Application Priority Data

September 22, 2004 (EP).....................................04022605.2 --.

Signed and Sealed this  
Twenty-seventh Day of March, 2012

David J. Kappos  
*Director of the United States Patent and Trademark Office*